H. B. LOEB.
AMUSEMENT DEVICE.
APPLICATION FILED JUNE 23, 1921.
1,425,264. Patented Aug. 8, 1922.
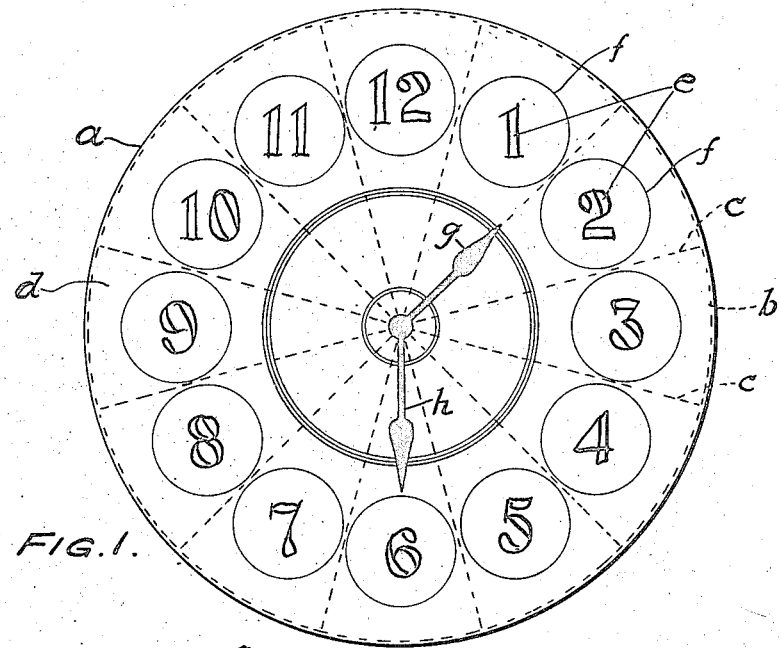
FIG.1.
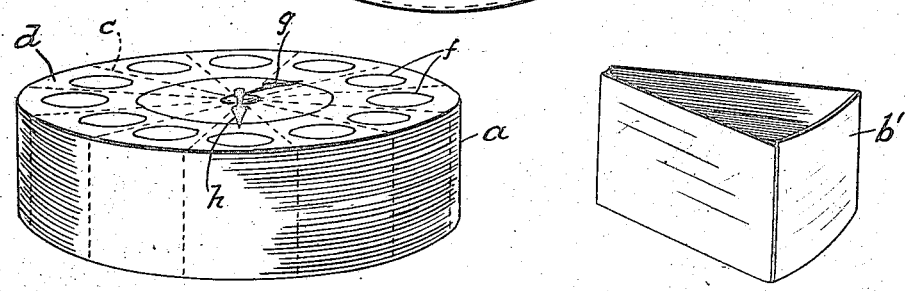
FIG.2. FIG.3.
FIG.4. FIG.5. FIG.6. FIG.7. FIG.8.
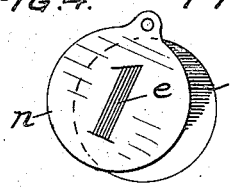 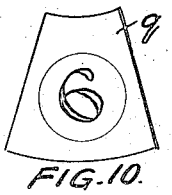 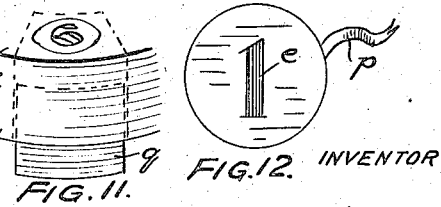
FIG.9. FIG.10. FIG.11. FIG.12.
WITNESS:
Rob. R. Kitchel.
INVENTOR
Herbert B. Loeb
BY Frank S. Busser
ATTORNEY.

UNITED STATES PATENT OFFICE.

HERBERT B. LOEB, OF PHILADELPHIA, PENNSYLVANIA.

AMUSEMENT DEVICE.

1,425,264.          Specification of Letters Patent.          Patented Aug. 8, 1922.

Application filed June 23, 1921. Serial No. 479,709.

*To all whom it may concern:*

Be it known that I, HERBERT B. LOEB, a citizen of the United States, residing at Philadelphia, county of Philadelphia, and State of Pennsylvania, have invented a new and useful Improvement in Amusement Devices, of which the following is a full, clear, and exact description, reference being had to the accompanying drawings, which form a part of this specification.

My invention relates to a novel form of amusement device for children.

My invention has for its object the provision of a novel device whereby amusement may be afforded to children and which at the same time will possess a certain value from an educational standpoint.

More specifically my invention contemplates a novel device, having a body portion adapted to contain a plurality of articles, each contained separately, and a cover, bearing the indicia and indicating means usual to the face of a clock and provided with means permitting access to the body and to the articles contained therein separately, at a plurality of points corresponding to the indicia.

Having now indicated the nature of my invention in a general way, I will proceed to a detailed description of a preferred embodiment thereof, with reference to the accompanying drawings, in which—

Fig. 1 is a plan view of a device embodying my invention.

Fig. 2 is a perspective view of the subject of Fig. 1.

Fig. 3 is a perspective view of a detail of the device of Fig. 1.

Fig. 4 is a plan view of a detail of the subject of Fig. 1.

Figs. 5-9 and 12 illustrate modifications of the detail shown in Fig. 4.

Figs. 10 and 11 are views of modifications in detail of the structure.

Referring to Figures 1 to 4 inclusive: The device illustrated comprises a circular body portion $a$, closed at the bottom, the interior of which is subdivided into a series of twelve compartments $b$ by means of partitions $c$, or, if desirable, separate containers $b'$, having the form of the compartments $b$, may be fitted into the body $a$.

The body $a$ is closed at the top by means of the cover $d$ which may be formed integrally with the body, as shown, or may be separate. The cover has printed on it the numerals $e$ usually found on a clock face, the numerals being contained in circles $f$, each of which is positioned over one of the compartments $b$ in the body, and a pair of clock hands $g$ and $h$ are pivoted centrally thereof.

Referring to Figures 5-9 and 12 in which are illustrated modifications of the detail illustrated in Figure 4: Figure 5 illustrates the numeral enclosed in a ring of spaced perforations $i$. Figure 6 illustrates the numeral enclosed in a ring of broken lines $j$. Figure 7 illustrates the numeral printed on a piece of translucent paper $k$ adapted to be inset in the cover $d$. Figure 8 illustrates the numeral placed directly on the article, as a cylinder of cake $m$, adapted to be contained in the body $a$. Figure 9 illustrates the numeral placed on a separate cover $n$ pivoted to the cover $d$ and adapted to close an aperture $o$ in the cover. Figure 12 illustrates a modification wherein a ribbon $p$ is attached to the article and enables the article to be pulled out of its compartment.

Referring now to Figure 10: The compartments $q$ are formed separately and their narrow ends are formed concave so that they may be inserted about a circular compartment centrally positioned in the body $a$ and adapted to hold clock work mechanism for driving the hands $g$ and $h$, as an ordinary clock, if desired.

In Figure 11 is illustrated a modification wherein the bottom of the body $a$ is so constructed as to permit of the removal of the compartment $q$ therethrough.

In practice, the device shown in Figure 1, provided with any of the various means disclosed for permitting access to the compartments $c$, is filled by placing in each compartment a toy, candy, games, medicines, books, or any other article or combination of articles. The articles are then obtained at intervals of greater or shorter duration by breaking in the portion of the cover over any given compartment, the particular compartment for any given time being indicated by manipulation of the clock hands. An especially desirable use of the device is for the amusement of a sick child, in that it provides an interesting and instructive means of presenting the child with a series of inexpensive toys or other source of amusement, as a book, a picture, or what not, periodically as the child tires of its toy and requires a new one. The device, obviously, also provides an interesting method of administering periodic doses of medicine, if the compartments be supplied with a dose of medicine instead of a toy, although a toy might also be included with the medicine.

It will now be obvious that my invention is capable of a variety of modifications from the simplest form wherein the clock face, numerals and hands are printed on the cover to a more complicated form wherein an operative clock is located centrally of the body with the compartments grouped about its periphery, and it should be noted that any modification embodying the idea of the device and modifications disclosed is within my invention.

Having now fully described my invention, what I claim and desire to protect by Letters Patent is:

1. A container comprising a body portion, a plurality of compartments therein, a cover for said body, said cover being so arranged as to permit access to the several compartments individually, varying indicia carried by the cover adjacent each of the compartments respectively, and indicating means adapted to cooperate with said varying indicia to indicate the position of the various compartments respectively.

2. A container comprising a body portion, a plurality of compartments therein, a common cover for said compartments, said cover being so arranged as to permit access to the compartments individually, varying indicia on said cover adjacent the several compartments in the body respectively, and indicating means adapted to cooperate with the varying indicia to indicate the compartments respectively.

3. A container comprising a plurality of compartments, a cover therefor, said cover bearing the indicia of a clock face, each of the figures thereof being opposite one of the compartments, clock hands on the cover, and means whereby admission may be gained to any of the compartments individually.

4. A container comprising a plurality of compartments, each adapted to contain an article, a cover for said container, varying indicia on said cover in spaced relation and positioned to overlie said compartments respectively, indicating means on said cover adapted to cooperate with said indicia to indicate said compartments respectively, and means whereby admission may be obtained to said compartments individually.

5. A container comprising a body portion, a plurality of compartments therein, and a cover for said body having associated therewith the similitude of a clock face, said cover being so arranged as to permit access to the compartments individually.

6. A container comprising a body, a cover therefor having thereon the similitude of a clock face, and a series of compartments within said body corresponding in number to the hour numerals of a clock, said cover being arranged to permit access to said compartments individually.

7. A container comprising a body portion, a plurality of compartments therein, a cover so arranged as to permit access to said compartments individually, and a clock face associated with said cover, the varying indicia on said clock face being positioned adjacent to said compartments respectively and the hands of said clock serving to indicate said compartments respectively.

In testimony of which invention, I have hereunto set my hand, at Philadelphia, Pa., on this 22nd day of June, 1921.

HERBERT B. LOEB.